Oct. 5, 1948.  F. D. FRISBY  2,450,425
RETAINING RING
Filed May 3, 1945
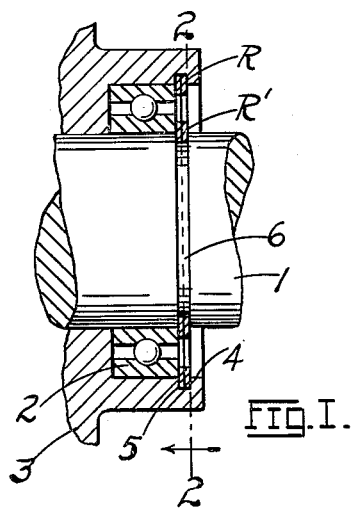
Fig. 1.
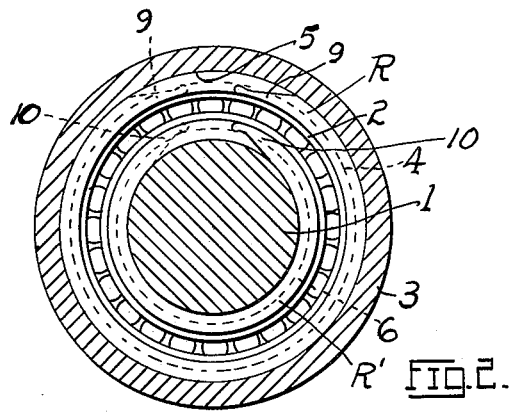
Fig. 2.
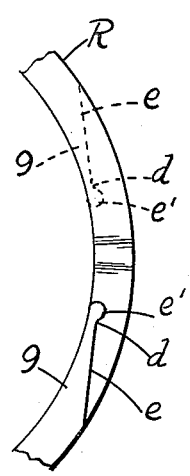
Fig. 3.
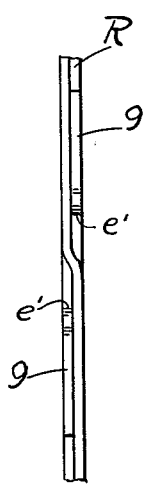
Fig. 4.
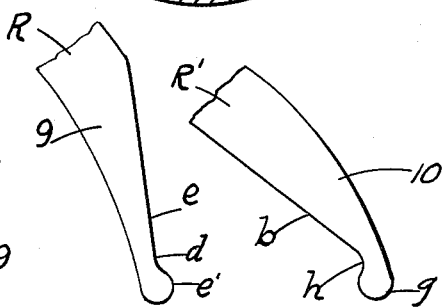
Fig. 5. Fig. 6.
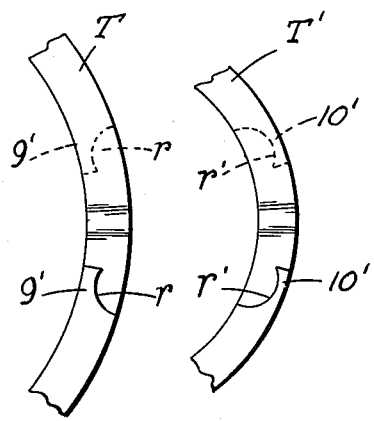
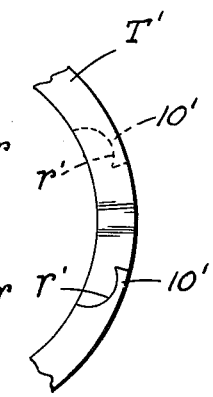
Fig. 7. Fig. 8.
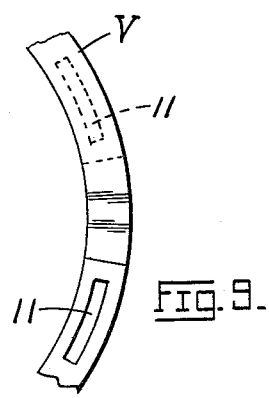
Fig. 9.
INVENTOR.
Frank D. Frisby.
BY
Harry A. Benner
ATTY.

Patented Oct. 5, 1948

2,450,425

UNITED STATES PATENT OFFICE 2,450,425

RETAINING RING

Frank D. Frisby, St. Louis, Mo., assignor to Ramsey Accessories Manufacturing Corporation, St. Louis, Mo., a corporation of Missouri Application May 3, 1945, Serial No. 591,669

7 Claims. (Cl. 85—8.5)

My invention has relation to improvements in retaining rings and it consists in the novel features of construction more fully set forth in the specification and pointed out in the claims.

The principal object of the invention is to provide a retaining ring for holding parts, such as shafts and housings, in assembled relation, and at the same time is capable of taking a thrust-load. A further object is to provide such a ring that is complete in itself so that it may be easily and quickly applied or removed. These objects, together with other advantages of the invention, will be better apparent from a detailed description in connection with the accompanying drawings, in which:

Figure 1 is fragmentary section of a bearing housing in which a shaft and ball-bearing are provided with my improved retaining rings; Figure 2 is a transverse section taken on a plane indicated by the line 2—2 of Figure 1; Figure 3 is a fragmentary enlarged plan view of my improved retaining ring designed for expanding; Figure 4 is an edge view thereof; Figure 5 is a plan of one end of the ring still further enlarged; and Figure 6 is a view similar to Figure 5 but showing a contracting ring; Figure 7 is a modified form of an expanding ring; Figure 8 is a modified form of a contracting ring; and Figure 9 is a further modified form of both expanding and contracting rings.

Referring to the drawings, I represents a shaft supported on a ball-bearing assembly 2 in a housing 3 in any manner well known in the art. In order to retain the ball-bearing assembly in place and receive the thrust load of the shaft, retaining rings R and R' are provided. The cylindrical wall 4 of housing 3 has an annular groove 5 in a plane adjacent to the ball-bearing assembly 2, and shaft I has an annular groove 6 in the same plane with groove 5 in which grooves the retaining rings R, R' are respectively disposed in closely fitted relation with the ball-bearing assembly 2. As shown in Figures 3 and 4, the retaining rings are formed of spring steel as a two-coil helix in true circular shape and are of a size that the inner ring R' will contract to tightly embrace the bottom of groove 6, and the outer ring R will expand into groove 5. Obviously, in applying ring R, it is contracted until it fits within cylindrical wall 4, and in applying ring R', it is expanded to pass over shaft I.

Because of the winding and unwinding action of the helical spring, both rings R and R' will always retain their circularity in action and will fit their grooves throughout their entire contour.

To facilitate the removal of the rings R and R' from their respective grooves, I have formed the ends 9, 9 and 10, 10 of the rings respectively as shown in Figures 5 and 6. The ring R (which is designed to expand into place) has its ends 9 formed with a bevel edge e inclined inwardly to the rounded extremity e' at the base of which is a slight depression d. When the ring R is seated in groove 5, the extremity e' and depression d will be exposed (Figure 2) so that a tool, such as a screw-driver, may be applied to force the ring from the groove.

The ring R' (which is designed to contract into place) has its ends 10 formed with a bevel b inclined outwardly to rounded extremity g at the base of which is a depression h. In order to remove ring R' from groove 6, a screw-driver may be applied to the extremity g and the ring gradually expanded and worked out of the groove 6.

From the foregoing it will be apparent that I have provided a retaining ring capable of many applications and that may be applied or removed without the need of special tools.

In Figure 7, I show a modified form of expanding ring T having its ends 9', 9' provided with outer arcuate recesses r, r, and in Figure 8 I show a modified form of contracting ring T' having its ends 10', 10' provided with inner recesses r', r'.

In Figure 9, a ring V is shown in which the ring ends are provided with slots 11, 11 for either expanding or contracting rings.

Having described my invention, I claim:

1. A retaining ring comprising two similar annular coils formed from a continuous winding, said coils lying in adjacent parallel planes in intimate relation and connected by an offset portion, the ends of the coils lying outside the inner circumference of the ring and being in spaced relation and tapered toward one of their circumferential margins.

2. A retaining ring comprising two similar annular coils formed from a continuous winding, said coils lying in adjacent parallel planes in intimate relation and connected by an offset portion, the ends of the coils lying outside the inner circumference of the ring and being in spaced relation and tapered and recessed to permit reception of a tool.

3. A retaining ring comprising two similar annular coils formed from a continuous winding, said coils lying in adjacent parallel planes in intimate relation and connected by an offset portion, the ends of the coils lying outside the inner circumference of the ring and being in spaced relation and tapered toward their inner circumferential margins.

4. A retaining ring comprising two similar annular coils formed from a continuous winding, said coils lying in adjacent parallel planes in intimate relation and connected by an offset portion, the ends of the coils lying outside the inner circumference of the ring and being in spaced relation and tapered toward their outer circumferential margins.

5. A retaining ring comprising two similar annular coils formed from a continuous winding, said coils lying in adjacent parallel planes in intimate relation and connected by an offset portion, the ends of the coils lying outside the inner circumference of the ring and being in spaced relation and tapered toward one of its margins and having a rounded extremity projecting toward the tapered edge.

6. A retaining ring comprising two similar annular coils formed from a continuous winding, said coils lying in adjacent parallel planes in intimate relation and connected by an offset portion, the ends of the coils being in spaced relation and lying outside the inner circumference of the ring, and having suitable recessed formations to permit reception of a tool.

7. A retaining ring comprising two similar annular coils formed from a continuous winding, said coils lying in adjacent parallel planes in intimate relation and connected by an offset portion, the ends of the coils being in spaced relation and lying within the outer and inner margins of the ring, and having suitable recessed formations to permit reception of a tool.

FRANK D. FRISBY.

REFERENCES CITED

The following references are of record in the file of this patent:

UNITED STATES PATENTS

| Number | Name | Date |
|---|---|---|
| Re. 18,144 | Heiermann | Aug. 4, 1931 |
| 295,158 | Fisher | Mar. 18, 1884 |
| 2,255,217 | Hill | Sept. 9, 1941 |

FOREIGN PATENTS

| Number | Country | Date |
|---|---|---|
| 457,087 | Great Britain | Nov. 20, 1936 |